United States Patent
Toombs

[15] 3,681,655
[45] Aug. 1, 1972

[54] GLASS-CLAD WIRE GAS DISCHARGE DISPLAY MATRIX

[72] Inventor: Peter Alan Birrell Toombs, Harlow, England

[73] Assignee: International Standard Electric Corporation, New York, N.Y.

[22] Filed: Nov. 5, 1970

[21] Appl. No.: 87,197

[30] Foreign Application Priority Data

Aug. 28, 1969 Great Britain..............42,813/69

[52] U.S. Cl.................315/169 R, 313/210, 313/217, 315/169 TV, 315/235, 315/240, 315/260, 340/166 EL

[51] Int. Cl..........................H01j 61/06, H05b 41/30

[58] Field of Search...315/167, 169 R, 169 TV, 84.6, 315/260, 235, 240; 340/166 EL, 166 R; 313/210, 217, 220

[56] References Cited

UNITED STATES PATENTS 3,133,773  5/1964  Ecker.........................340/166 R

FOREIGN PATENTS OR APPLICATIONS 404,861  10/1967  Australia....................315/169 R

*Primary Examiner*—Roy Lake
*Assistant Examiner*—Siegfried H. Grimm
*Attorney*—C. Cornell Remsen, Jr., Walter J. Baum, Paul W. H. Emminger, Charles L. Johnson, Jr., Philip M. Bolton, Isidore Togut, Edward Goldberg and Menotti J. Lombardi, Jr.

[57] ABSTRACT

A gas discharge display matrix includes a plurality of glass-clad conductors woven into a form of matrix cross-over points. The matrix is enclosed within a glass envelope filled with an ionizable gas or a mixture of gases. By applying alternating voltage to selected pairs of the glass-clad wires, the cross-over point defined by the selected pair of wires is made to ionize and discharge the gas surrounding it and emit light. Capacitor coupling and switching circuits may be used to selectively apply the alternating voltage.

8 Claims, 5 Drawing Figures

Inventor
PETER A. B. TOOMBS
By Sang Ki Lee
Attorney

PATENTED AUG 1 1972 3,681,655
SHEET 3 OF 3
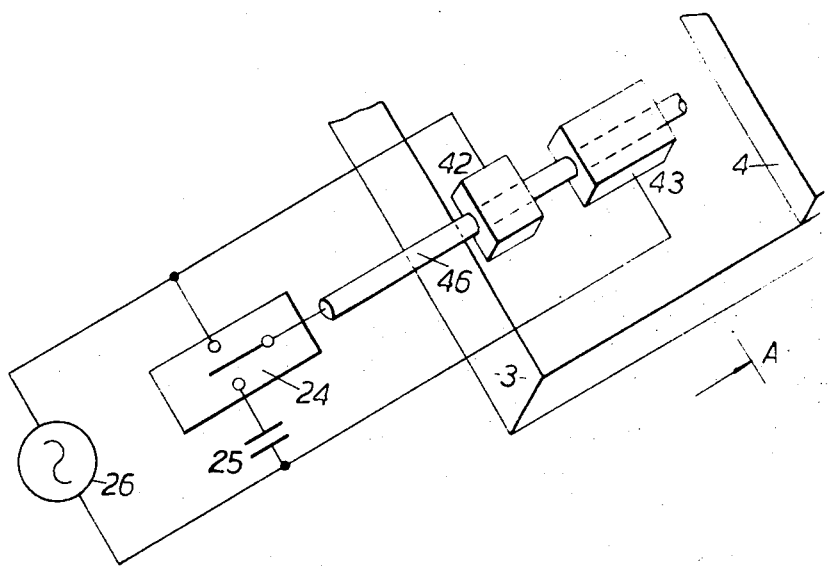
FIG 4a.
FIG 4b.
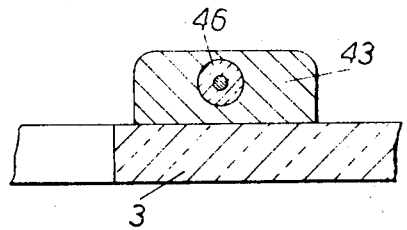
Inventor
PETER A. B. TOOMBS
By Sang Ki Lee
Attorney

GLASS-CLAD WIRE GAS DISCHARGE DISPLAY MATRIX

BACKGROUND OF THE INVENTION

1. Field of the Invention

This invention relates to gas discharge display matrices, generally, and, in particular, to the type of display matrices in which gas discharges are excited between pairs of electrodes which are isolated from their discharges by electrical insulation.

2. Description of the Prior Art

It is known that it is possible to excite a glass gas discharge cell having no internal electrodes by applying an alternating electric field to a pair of electrodes placed on opposite sides of the cell in contact with the cell walls. Under these conditions, if the peak amplitude of the applied field is sufficiently large to induce a field within the gas which exceeds its breakdown, the gas will be ionized and light will be emitted. When the gas ionizes, the ions and electrons will travel in opposite directions under the influence of the applied field. But since the electrodes are external to the cell there will be no net charge transfer to them. Consequently the applied field will tend to be neutralized by the build up of charge on the internal surface of those parts of the walls of the cell underlying the electrodes. This build up of wall charge first causes the discharge to be extinguished, and then later, after the direction of the applied field is reversed, it reinforces the applied field and advances the onset of another discharge. In this way an intermittent discharge is maintained.

Moreover, it is also known that if the cell is powered by an alternating voltage, typically of the order of 300 kHz, whose amplitude is less than that sufficient to cause breakdown but greater than half this value, then the cell can be demonstrated to possess a form of bistability. Under these conditions, if no intermittent discharge has been first initiated it is clear that the applied field will never be sufficient to cause the onset of one.

If, however, there is superimposed on this alternating voltage a voltage spike of sufficient amplitude to be capable of exceeding temporarily the breakdown voltage, or if the amplitude of the applied alternating voltage is temporarily increased so that its peaks exceed the breakdown voltage, then an intermittent discharge is excited which will be maintained after the voltage spike, or temporary increase in applied voltage, has been removed. This intermittent discharge can later be extinguished by reducing the amplitude of the applied alternating voltage beneath a certain critical value for an interval of about half a second, after which the amplitude can be restored to its original value without re-exciting the intermittent discharge.

The switching facility, or bistability, of this type of gas cell under these conditions makes possible their connection together in a single coordinate array to form a display matrix. This involves the employing of an inter connection pattern in which the electrodes on one side of the cells are connected together by rows while those on the other are connected together by columns. Previously a proposal has been made to construct such a display panel consisting essentially of a stack of three sheets of glass, the center one of which is perforate, having a matrix of small holes. The edges of the three glass sheets are sealed together and the resultant structure is first evacuated before filling with a suitable gas mixture to provide the desired color of glow discharge. Each hole in the center sheet thus forms a fairly well isolated cell containing an ionizable gas. The electrodes for these cells are provided by sets of transparent conducting gold strips deposited on the outer surfaces of the outer sheets of glass, those on one side being in the form of columns while those on the other are in the form of rows. One problem associated with the form of construction is the provision of relatively transparent electrodes having a low enough resistance not to cause a significant drop in voltage between their ends when delivering the amount of current required for such a display panel.

SUMMARY OF THE INVENTION

It is therefore the object of the present invention to eliminate the need for using transparent electrodes for the gas discharge matrix, and generally to simplify the structure of the discharge matrix.

In accordance with the present invention, the object is achieved by providing a gas discharge display matrix having a woven mesh of electrically insulated wires or strips which define a matrix array of cross-over points. The woven mesh is contained within an envelope filled with an ionizable gas or mixture of gases. An alternating voltage is applied to the selected pair of wires or strips defining each selected cross-over point in the matrix of the mesh so as to excite an intermittent glow discharge in the localized region surrounding that cross-over point.

The foregoing and other features of the invention will be evident from the following description of a gas discharge display matrix together with associated circuitry for operating it. The description refers to the accompanying drawings in which:

FIG. 4a shows a perspective view of the capacitive coupling of a glass-clad wire to a power source; and FIG. 4b shows a cross-sectional view of a capacitive coupling of the glass-clad wire.

DETAILED DESCRIPTION OF THE PREFERRED EMBODIMENT

Figure 1:
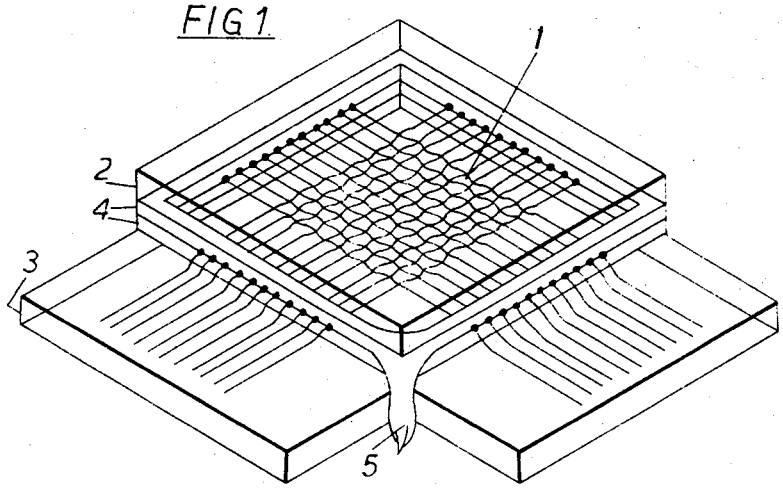
FIG. 1 depicts the display matrix.

FIG. 1 depicts an 11 × 11 element gas discharge display matrix, the elements of the matrix being formed at the cross-over points of a woven mesh 1 of glass clad copper wires. These wires are approximately 0.001 inches diameter with a 0.0005 inches diameter copper core and the distance between adjacent wires in the mesh is approximately 0.025 inches. The mesh is contained within a glass envelope formed by a square sheet 2 and an L-shaped sheet 3 separated by a spacer 4 which is formed in two parts between which the wires of the mesh are clamped and sealed. One end of each wire of the mesh is led out through the spacer and secured to the sheet 3 to provide a terminal connection. The envelope is evacuated through a tube 5, filled to about atmospheric pressure with an argon neon gas mixture containing 1 percent neon and 99 percent argon, and then the tube 5 is sealed off.

Where a coarser matrix is required a larger diameter of glass clad wire may be employed. Connection to the fine glass clad wire described above may be made by using the glass cladding as a flux in a brazing operation. Alternatively since the glass cladding is relatively brittle it may be first removed by crushing, for instance in smooth-jawed pliers.

Figure 2:
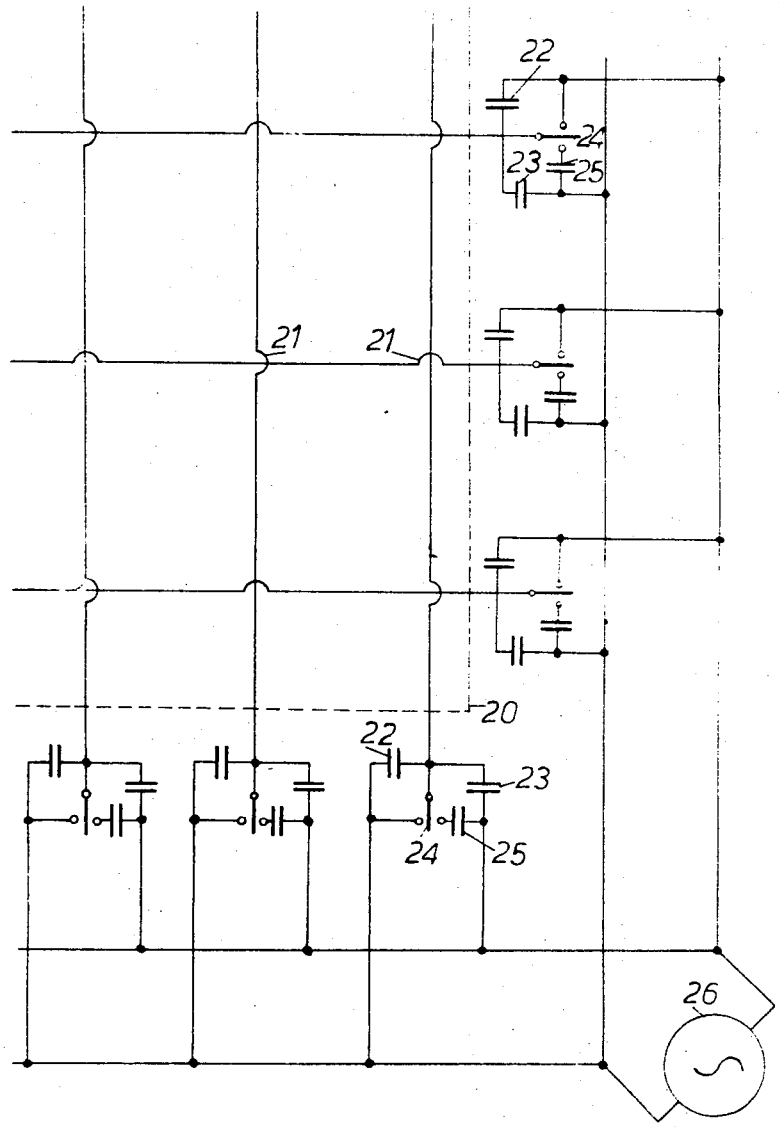
FIG. 2 is a circuit diagram showing a method of powering the matrix.

A method of powering the matrix so that individual cross-over points can be selected for switching off or on will now be described with reference to FIGS. 2, 3, 4a and 4b. FIG. 2 is a circuit diagram depicting the connection to one corner of the matrix which is indicated at 20. In this figure cross-over points of the matrix are indicated at 21. Two capacitative couplings to each wire of the matrix are made to form capacitors 22 and 23, whilst in addition there is made a direct connection to a three position switch 24. As shown in FIGS. 4a and 4b, the capacitive couplings may be made by laying conducting strips 42 and 43 across the glass clad wire 46 where they emerge from the envelope 4. In its first position a switch 24 shunts its associated capacitor 22, in its second it makes no connection, and in its third position capacitor 23 is shunted by an additional capacitor 25. The power for the whole matrix is supplied by an a.c. generator 26 developing several hundred volts at about 300 kHz.

Figure 3:
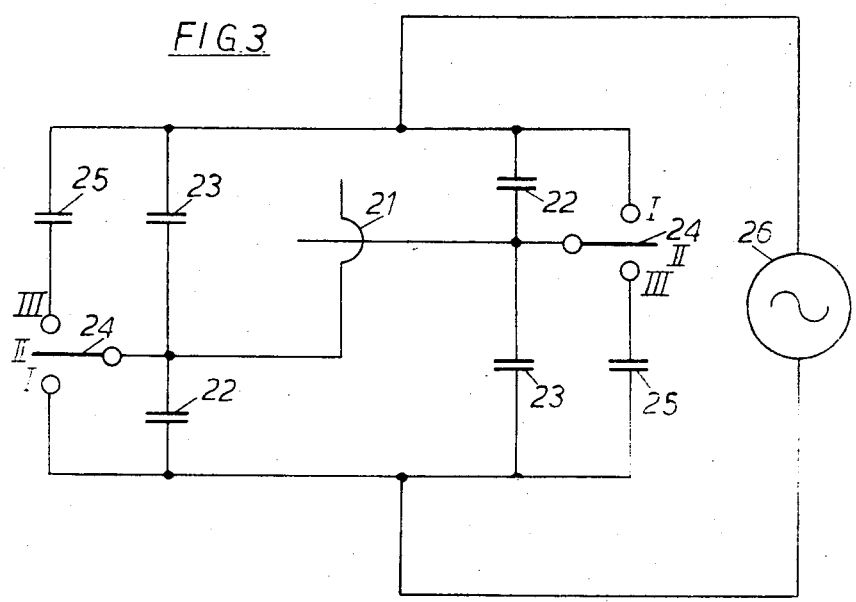
FIG. 3 is a circuit diagram showing how an individual cross-over point in the matrix may be powered.

The functioning of this circuit may be better understood by reference to FIG. 3 which shows the connections to just one matrix cross-over point. When the two switches 24 are in their second positions II, that is, the off positions, it can be seen from FIG. 3, ignoring for the present the effect of the two capacitors 23, that the cross-over point 21, which is primarily a capacitative element, is series connected with two other capacitors 22. Thus the full potential of the generator 26 is not developed across the cross-over point 21. The potential which is developed across this cross-over point is however arranged to be approximately in the middle of the range of value for which the device is bistable. If one of the switches 24 is set to its first position I its associated capacitor 22 is short circuited, and in consequence the potential which is developed across the cross-over point is increased. Conversely if that switch is set to its third position III the series combination of the cross-over point and the capacitor 22 associated with the other switch become shunted by capacitor 25, and in consequence the potential which is developed across the cross-over point is decreased.

The values of the capacitances are so chosen that neither the increase in potential caused by the switching of only one switch to its first position nor the decrease caused by the switching of the switch to its third position are sufficient to take the potential developed across cross-over point outside the bounds of its bistability region. In other words if an intermittent discharge has not been excited at this cross-over point the setting of only one switch 24 to its first position I is not sufficient to cause a discharge to be initiated, and conversely if an intermittent discharge has previously been excited the setting of only one switch 24 to its third position III is not sufficient to cause the intermittent discharge to be extinguished. However the values of the capacitors are such that if the two switches corresponding to a given cross point are both set to their first positions I, the resultant potential developed across that cross-over point is taken outside the bistability region thereby causing the initiation or maintenance of an intermittent discharge at that cross-over point. Conversely if the two switches are both set to their third positions III, the resultant potential developed across the cross-over point is again taken outside the bistability regions thereby causing the extinction of any intermittent discharge at this point.

Illustrative values of the elements of the embodiment shown in FIGS. 2, 3, 4a and 4b are as follows:

The maintaining voltage of the cross-point once ionized is typically 230 volts (peak) with firing voltages in excess of 260 volts and extinguishing voltages below 200 volts. Variations in the capacitance of a line due to variations in the number of the cross-points are not in excess of 1 pF and so by choosing $C_{23}$ to be 50 pF these variations will have negligible effect. To switch on, that is, to ionize the cross-point and effect gas discharge from a non-ionized state, a voltage in excess of 260 volts is required while the discharge can be maintained at 230 volts once the cross-point is ionized. If a generator voltage of 270 volts (peak) is chosen, then $C_{22}$ must be 625 pF and if only one of the two $C_{22}$s associated with a crossover point is shorted out the resulting voltage is in the bistable range. Similarly a suitable value for $C_{22}$ is 59 pF.

It is the ratio of the values of $C_{22}$, $C_{23}$ and $C_{25}$ which is important rather than the absolute values although the following practical considerations should be born in mind: (i) The value of $C_{23}$ should be large enough to overcome variations in panel capacitances which vary with the number of the cross-points ionized. This will limit it to a minimum of about 10 pF; (ii) Lower limits on capacitance values will also be provided by the need to overcome the effects of stray capacitance, particularly in the switch used.

Alternatively, instead of using conductive strips as shown in FIGS. 4a and 4b to form the capacitances, conventional discrete components may be used which have high enough values to allow mechanical switches to be used without worrying about stray capacitances.

When an intermittent discharge is excited at a cross-over point the capacitance of that point is changed and so in the absence of capacitors 23 associated with each row and column of the matrix the amount of potential dropped across the two capacitors 22 associated with a given matrix cross-over point would depend on how many other cross-over points were excited in the row and column defined by the given cross-over point. In order to prevent this dependence the potential dividing action is stabilized by employing capacitors 23 associated with each row and column. These having a capacitance that is large compared with the maximum capacitance capable of being presented by a single row or column of cross-over points.

It will be appreciated that this method of switching is slow because, although a cross-over point can be excited relatively quickly by a switch-on signal lasting only a few cycles, the duration of a switch-off pulse has to be rather longer in order to be comparable with the decay time of wall charges built-up on the glass cladding of the wires in the vicinity of the cross-over point. This time may be in the region of half a second. A shorter switch-off pulse will not permit a significant decay of charge on the cladding. The discharge at the cross-over point will only be extinguished for the duration of this pulse, after which the residual charges on the cladding will supplement the reapplied sustaining voltage to the extent that an intermittent discharge is reignited. This time may be in the region of half a second.

It is to be understood that the foregoing description of specific examples of this invention is made by way of example only and is not to be considered as a limitation on its scope.

What is claimed is:

1. A gas discharge display arrangement activated by an alternating voltage source comprising:
   a plurality of electrically insulated wires arranged in rows and columns to form a matrix array of cross-over points;
   a light transparent envelope filled with an ionizable gas enclosing said matrix; and
   means for applying said alternating voltage source to a selected pair of wires defining a selected cross-over point in the mesh to excite an intermittent glow discharge in the localized region surrounding said selected cross-over point.

2. An arrangement according to claim 1, wherein said wires are glass-clad copper wires.

3. An arrangement according to claim 2, including a control circuitry coupled to said matrix array to control said glow discharge.

4. An arrangement according to claim 3, said control circuitry includes:
   a plurality of capacitive means respectively coupling corresponding ones of said wires to said alternating voltage source; and
   switching means for shunting selected pairs of said capacitive means so that said alternating voltage source is directly applied across said selected pair of wires thereby effecting ionization and discharge of the cross-over point formed by said selected pair.

5. An arrangement according to claim 4, wherein said capacitive means includes a pair of conductive strips respectively surrounding said glass-clad wire adjacent said glass envelope and each having a predetermined capacitance between each of said conductive strips and said wire.

6. An arrangement according to claim 5, wherein said glass-clad copper wires are woven to form said matrix array of cross-over points.

7. An arrangement according to claim 6, wherein said light transparent envelope contains a mixture of ionizable gases.

8. An arrangement according to claim 7, wherein said transparent envelope is made of light transparent glass.

* * * * *